(12) United States Patent
Freeborn et al.

(10) Patent No.: US 11,206,934 B2
(45) Date of Patent: Dec. 28, 2021

(54) WALL HANGER FOR A SKATEBOARD DECK

(71) Applicants: John Freeborn, Oakland, CA (US); Jack Marple, Seattle, WA (US)

(72) Inventors: John Freeborn, Oakland, CA (US); Jack Marple, Seattle, WA (US)

(73) Assignee: Freeborn Publishing Incorporated, Walnut, CA (US)

( * ) Notice: Subject to any disclaimer, the term of this patent is extended or adjusted under 35 U.S.C. 154(b) by 340 days.

(21) Appl. No.: 16/600,086

(22) Filed: Oct. 11, 2019

(65) Prior Publication Data

US 2021/0106151 A1    Apr. 15, 2021

(51) Int. Cl.
| | | |
|---|---|---|
| A63C 17/00 | (2006.01) | |
| A47G 1/16 | (2006.01) | |
| F16M 13/02 | (2006.01) | |
| A63C 17/01 | (2006.01) | |

(52) U.S. Cl.
CPC .......... *A47G 1/16* (2013.01); *A63C 17/0013* (2013.01); *A63C 17/017* (2013.01); *F16M 13/02* (2013.01); *A63C 17/01* (2013.01)

(58) Field of Classification Search
CPC .. F16M 13/02; F16M 11/041; A63C 17/0013; A63C 17/017
USPC ...................................................... 211/85.7
See application file for complete search history.

(56) References Cited

U.S. PATENT DOCUMENTS

| | | |
|---|---|---|
| 4,063,648 A | 12/1977 | Fuller et al. |
| 4,486,010 A | 12/1984 | Haas, Jr. |
| 5,833,079 A * | 11/1998 | Roberts .................. A47B 81/00 211/85.7 |
| 7,950,535 B1 | 5/2011 | Schmid |
| 8,540,197 B1 | 9/2013 | Krol et al. |
| 9,291,304 B1 | 3/2016 | Tu |
| 2014/0027594 A1 * | 1/2014 | Berman ................... A63C 5/03 248/316.8 |

FOREIGN PATENT DOCUMENTS

WO        02080739 A2    10/2002

OTHER PUBLICATIONS

PCT/US2020/055045, International Search Report, dated Jan. 20, 2021.
PCT/US2020/055045, Written Opinion of the International Searching Authority, dated Jan. 20, 2021.
Sk8ology Store, http://store.sk8ology.com, 3 pp. (accessed Sep. 4, 2019).

* cited by examiner

*Primary Examiner* — Bradley Duckworth
(74) *Attorney, Agent, or Firm* — Huse IP Law; Charles C. Huse

(57) ABSTRACT

A skateboard-deck wall hanger includes a base that has a central portion and a plurality of legs connected to and extending away from the central portion. Each leg of the plurality of legs is oriented to extend toward a wall when the base is mounted on the wall. The skateboard-deck wall hanger also includes four posts to be inserted into four respective holes on a skateboard deck. The four posts extend outward from the base and have a spacing that corresponds to a spacing of the four holes. The four posts are oriented to extend away from the wall when the base is mounted on the wall.

20 Claims, 4 Drawing Sheets

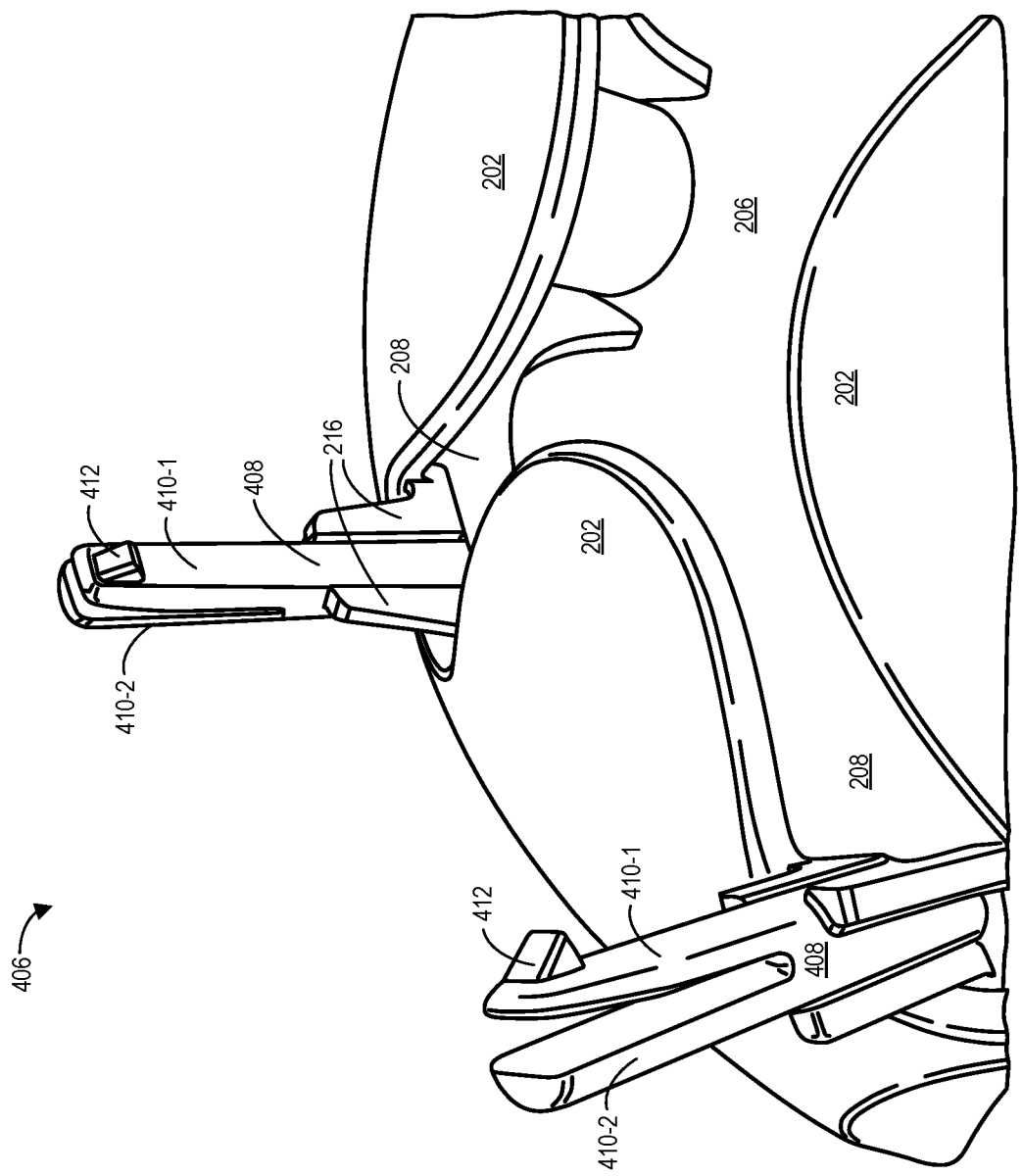

US 11,206,934 B2

WALL HANGER FOR A SKATEBOARD DECK

TECHNICAL FIELD

This disclosure relates to displaying skateboard decks, and more specifically to a hanger for hanging a skateboard deck on a wall.

BACKGROUND

Skateboard decks are often decorated with artwork, usually on the bottom of the deck. Accordingly, skateboarders may wish to hang skateboard decks on a wall as decorations, to display the artwork. Hanging a skateboard deck, however, presents challenges. For example, traditional skateboard-deck wall hangers may be difficult to install and awkward to use.

SUMMARY

According, there is a need for a skateboard-deck wall hanger that is simple to install and that allows skateboard decks to be hung from a wall quickly and easily. The skateboard-deck wall hangers disclosed herein offer those benefits.

In some embodiments, a skateboard-deck wall hanger includes a base that has a central portion and a plurality of legs connected to and extending away from the central portion. Each leg of the plurality of legs is oriented to extend toward a wall when the base is mounted on the wall. The skateboard-deck wall hanger also includes four posts to be inserted into four respective holes on a skateboard deck. The four posts extend outward from the base and have a spacing that corresponds to a spacing of the four holes. The four posts are oriented to extend away from the wall when the base is mounted on the wall.

In some embodiments, a skateboard-deck wall hanger includes a base and four posts. The base includes a central portion that has an aperture and four leaves extending into the aperture. The aperture has a central opening and four recesses extending radially from the central opening. Each recess of the four recesses is situated between two respective leaves of the four leaves. The central portion along with the aperture has a domed shape. The base also includes four legs connected to and extending away from the central portion. Each leg of the four legs is oriented to extend toward a wall when the base is mounted on the wall. A distal end of each leg of the plurality of legs has an opening to mount the base on the wall. The four posts, which are to be inserted into four respective holes on a skateboard deck, extend outward from an outer surface of the central portion of the base and have a spacing corresponding to a spacing of the four holes. Each post of the four posts forks into a plurality of extensions at a distal end. A first extension of the plurality of extensions of each post comprises a hook at a distal end. The outer surface is oriented to face away from the wall when the base is mounted on the wall. The central portion, the plurality of legs, and the four posts are integrally connected as a single piece.

In some embodiments, a hanger system includes a plurality of (e.g., two) skateboard-deck wall hangers, each of which is an example of either of the above two skateboard-deck wall hangers.

BRIEF DESCRIPTION OF THE DRAWINGS

For a better understanding of the various described implementations, reference should be made to the Detailed Description below, in conjunction with the following drawings.

FIG. 4 shows posts extending from the central portion of a skateboard-deck wall hanger in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
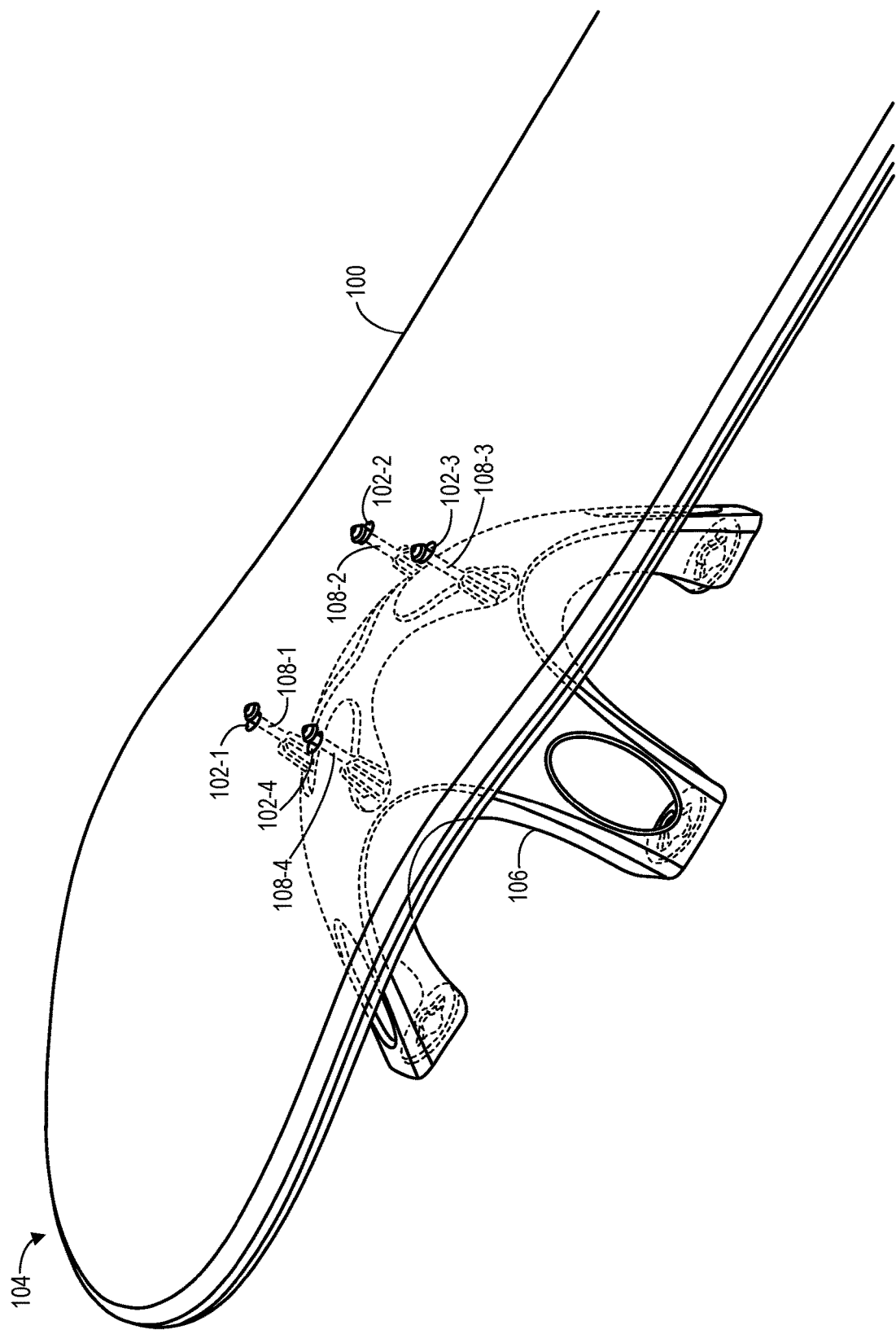
FIG. 1 shows a skateboard deck mounted on a skateboard-deck wall hanger, which may be mounted on a wall, in accordance with some embodiments.

Skateboard decks have two sets of four holes each, which are used for connecting mounting trucks for wheels to the skateboard decks. Each set of four holes is situated toward a respective end of the skateboard deck. FIG. 1 shows a portion of a skateboard deck 100 with a first set of four holes 102-1 through 102-4 situated toward a first end 104 of the skateboard deck 100. (The second end of the skateboard deck 100 and corresponding second set of four holes are not shown in FIG. 1.) The spacing of the holes 102-1 through 102-4 is standardized. Almost all modern skateboards have a spacing of approximately 2.125" (i.e., 2⅛") between the centers of holes 102-1 and 102-2 and also between the centers of holes 102-3 and 102-4, and have a spacing of approximately 1.625" (i.e., 1⅝") between the centers of holes 102-1 and 102-4 and also between the centers of holes 102-2 and 102-3. This spacing (i.e., this combination of spacings for the four holes 102-1 through 102-4) is sometimes referred to as "new school." An older generation of skateboards had a spacing of approximately 2.5" between the centers of holes 102-1 and 102-2 and also between the centers of holes 102-3 and 102-4, and had a spacing of approximately 1.625" between the centers of holes 102-1 and 102-4 and also between the centers of holes 102-2 and 102-3. This spacing (i.e., this combination of spacings for the four holes 102-1 through 102-4) is sometimes referred to as "old school." The spacings are approximate because there may be manufacturing variation and/or variation between manufacturers. For example, the new-school spacing between the centers of holes 102-1 and 102-2 and between the centers of holes 102-3 and 102-4 may be 2³⁄₃₂" or 2⅜" for some manufacturers. The holes have diameters of approximately ³⁄₁₆". This value is also approximate because of manufacturing variation (e.g., resulting from use of a drill press) and/or variation between manufacturers.

In FIG. 1, the skateboard deck 100 is mounted on a skateboard-deck wall hanger 106 in accordance with some embodiments. The hanger 106 may in turn be mounted on a wall (not shown for simplicity). The hanger 106 includes four posts 108-1 through 108-4 that extend outward. Distal ends of the posts 108-1 through 108-4 are inserted into the four holes 102-1 through 102-4 (e.g., through the holes 102-1 through 102-4, such that at least the distal ends of the posts 108-1 through 108-4 extend beyond the holes 102-1 through 102-4), thus securing (e.g., detachably securing) the skateboard deck 100 to the hanger 106 and thereby hanging the skateboard deck 100 on the wall. The height of the hanger 106 is sufficient to allow the posts 108-1 through 108-4 to be inserted into (e.g., through) the four holes 102-1 through 102-4 while the hanger 106 is mounted on the wall, despite the curvature of the end 104 of the skateboard deck 100. In some embodiments, instead of four posts 108-1 through 108-4, the hanger 106 has two posts 108 or three posts 108 spaced for insertion into respective holes 102.

Figure 2:
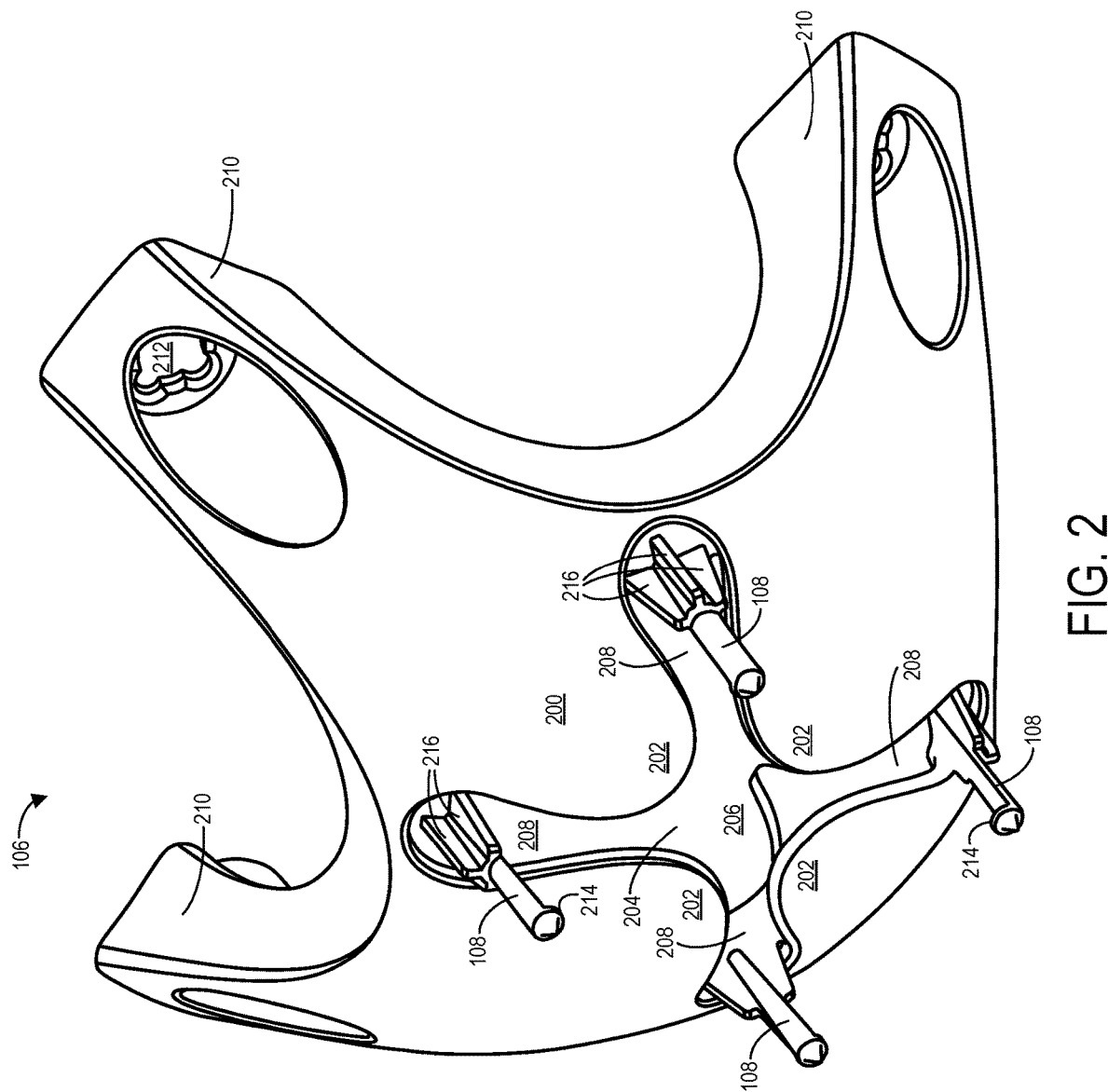
FIGS. 2 and 3 are perspective views respectively showing the top and bottom of the skateboard-deck wall hanger of FIG. 1 in accordance with some embodiments.
Figure 3:
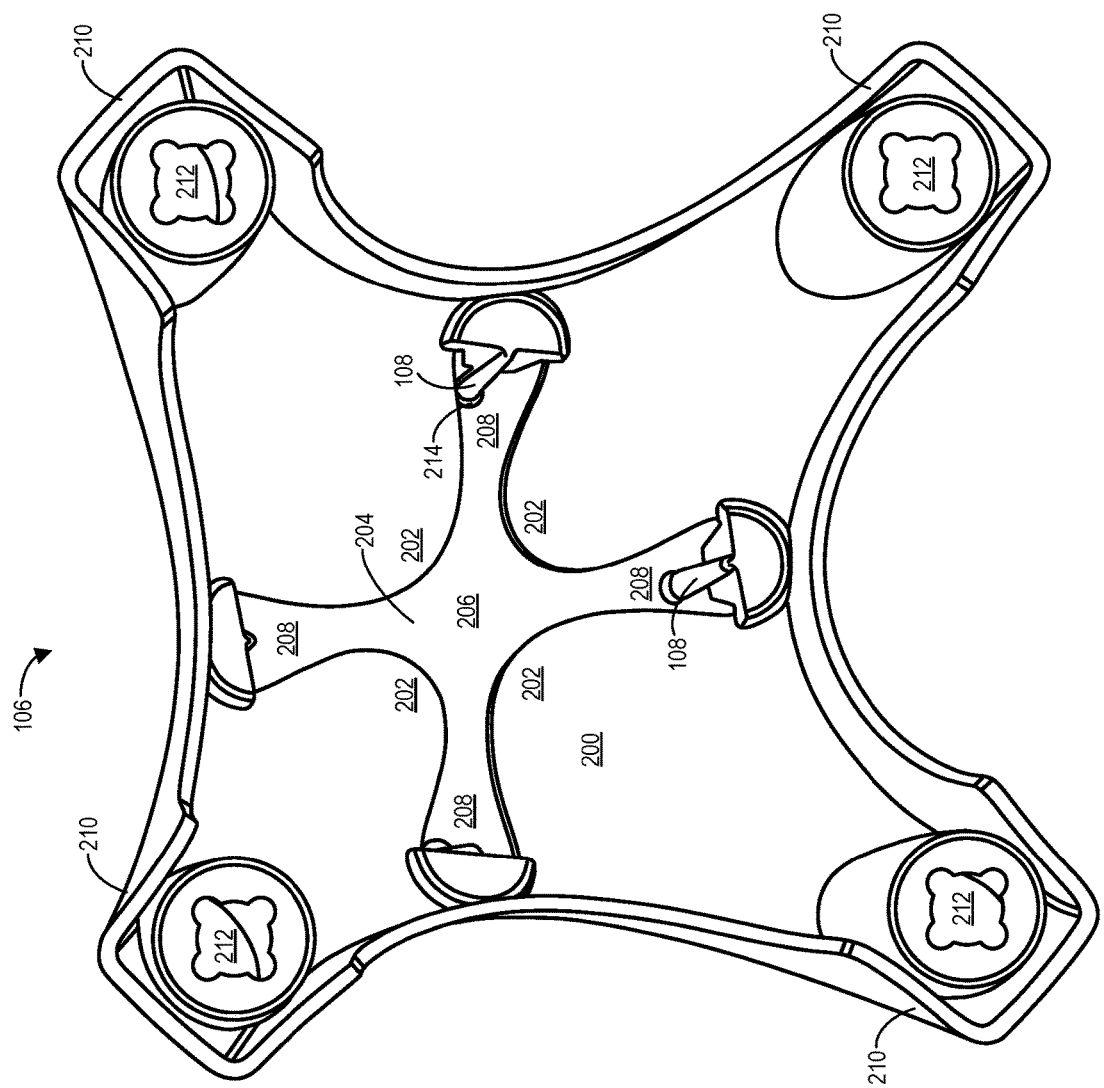

FIGS. 2 and 3 are perspective views showing the top (FIG. 2) and bottom (FIG. 3) of the hanger 106 (FIG. 1) in accordance with some embodiments. In addition to the four posts 108, the hanger 106 has a base, which includes a central portion 200 and four legs 210. Alternatively, the base may have fewer than four legs 210 (e.g., three legs) or more than four legs 210. The legs 210 are connected to the central portion 200 of the base and extend away from the central portion 200, such that the legs 210 extend toward the wall when the hanger 106, and thus the base, are mounted on the wall. For example, the distal end (with respect to the central portion 200) of each of the legs 210 touches the wall and/or a mounting mechanism used to mount the base to the wall. In some embodiments, the distal end of each of the legs 210 (e.g., a bottom surface of each leg 210), or of a portion of the legs 210, includes a hole 212 through which the mounting mechanism may be positioned to mount the base to the wall. Examples of the mounting mechanism may include a screw (e.g., to be screwed into a drywall anchor in the wall), nail, pushpin, hook, etc. In some embodiments, the base may be mounted to the wall without using any tools. For example, the base may be hung on the wall using pushpins or using adhesive hooks that hook to the legs 210 through the holes 212.

In some embodiments, the central portion 200 has an aperture 204. The central portion 200 may include four leaves 202 (or more generally, a plurality of leaves) that extend into the aperture 204. The aperture 200 may include a central opening 206 and four recesses 208 (or more generally, a plurality of recesses) that extend from the central opening 206 (and thus open into the central opening 206), such that each recess 208 is situated between two respective leaves 202. For example, the recesses 208 extend radially from the central opening, as shown in FIGS. 1-3. The aperture 204 may be substantially centered (e.g., to within manufacturing tolerances) on the central portion 200 of the base, such that the center of the aperture 204, which may be in the middle of the central opening 206, is substantially coincident with the center of the central portion 200. The leaves 202 may be substantially evenly radially distributed about the center of the aperture 204 (e.g., to within manufacturing tolerances), as may the recesses 208. The leaves 202 and recesses 208 may have smoothly curving edges. In some embodiments, the posts 108 are positioned at the ends of the recesses 208.

In some embodiments, the central portion 200 of the base (e.g., along with the aperture 204) is dome-shaped.

The posts 108 extend outward from the base, such that they extend away from the wall when the base is mounted on the wall, so that the distal ends of the posts 108 are farther from the wall than the respective points at which the posts 108 join the base. In some embodiments, the posts 108 extend outward from an outer surface of the central portion 200 of the base, wherein the outer surface is oriented to face away from the wall when the base is mounted on the wall. The posts 108 have a spacing that corresponds to a spacing of the four holes 102 (FIG. 1), such as new-school spacing or old school spacing. For example, the spacing of the posts 108 may substantially equal (e.g., to within manufacturing tolerances) the nominal spacing of holes 102 on a skateboard deck 100. In another example, the posts 108 may flex outward in a spring-like manner such that their spacing is wider than the spacing of holes 102 (e.g., the new-school spacing or old-school spacing) in a resting position, but the posts 108 can be displaced from their resting position (e.g., by pushing them toward each other) to allow them to be inserted into (e.g., through) the holes 102. This spring action for the posts 108 may result from the material (e.g., plastic) and shape of the central portion 200 of the base, including the shape of the aperture 204 and leaves 202. In this example, the spring action creates friction between the posts 108 and the holes 102 once the posts 108 have been inserted into (e.g., through) the holes 102, which may help hold the posts 108 in place in the holes 102 and thus secure the skateboard deck 100 to the hanger 106. In some embodiments, the posts 108 have fins 216 at and immediately above the points where they join the base. The fins 216 provide structural support and may limit how far the posts 108 can be pushed through the holes 102.

In some embodiments, the posts 108 have respective hooks 214 at their distal ends. The hooks 214 can be inserted through the holes 102 (e.g., are sufficiently springy or elastic to be compressed and pushed through the holes 102). Once the posts 108 have been inserted through the holes 102, such that the hooks 214 are situated on an opposite side of the skateboard deck 100 from the base, the hooks 214 extend laterally beyond respective holes 102 to secure the skateboard deck 100 to the hanger 106. In the example of FIG. 1, the skateboard deck 100 has been secured to the hanger 106 such that the top side of the skateboard deck 100 faces the base while the hooks 102 are situated on the bottom side of the skateboard deck 100. Alternatively, the orientation of the skateboard deck 100 with respect to the hanger 102 may be reversed.

In some embodiments, each post (or a portion of the posts) forks (i.e., splits) into a plurality of extensions at the distal end of the post. The plurality of extensions is jointly insertable into a respective hole 102 (e.g., through the hole 102, such that at least the distal ends of the extensions extend beyond the hole 102) on the skateboard deck 106. The plurality of extensions of a respective post may form a spring through their connections to the post, such that the extensions may be jointly inserted into (e.g., through) a hole 102 by pressing the extensions together and thus compressing the spring. The spring creates friction between the extensions and the hole 102 once the extensions have been inserted into (e.g., through) the hole 102. This friction helps hold the extensions in the hole 102 and thus secure the skateboard deck 100 to the hanger 106. One or more (e.g., all) of the extensions of a respective post (e.g., of each post) may have a hook at the distal end that is analogous to a hook 214.

FIG. 4 shows a portion of a skateboard-deck wall hanger 406 in which the posts 108 are replaced with posts 408 that each fork at the distal end into two extensions 410 (i.e., extensions 410-1 and 410-2). (Only two of the four posts 408 of the hanger 406 are shown in FIG. 4, and the legs 210 of the hanger 406 are not shown.) The two extensions 410 of a respective post 408 are jointly insertable into (e.g., through) a respective hole 102 on the skateboard deck 106. The two extensions 410 of a respective post 408 may form a spring through their connections to the post 408, as described above for the plurality of extensions, of which the two extensions 410 are an example. In some embodiments, a first extension 410-1 of the two extensions 410 has a hook 412 at the distal end. The hook 412 is analogous to the hook 214. Alternatively, both of the extensions 410-1 and 410-2 of a post 408 have hooks at their distal ends that are analogous to hooks 214.

In some embodiments, the central portion 200, the legs 210, and the posts 108/408 are integrally connected as a single piece (e.g., a single piece of plastic). For example, the hanger 106/406 may be formed through plastic injection molding or through three-dimensional (3D) printing. In some embodiments, the central portion 200 and the legs 210 are integrally connected as a single piece (e.g., a single piece of plastic, which may be formed through plastic injection molding or 3D printing) to which the posts 108/408 are connected using suitable connecting mechanisms (e.g., screws, bolts, etc.). In some embodiments, the central portion 200 and the posts 108/408 are integrally connected as a single piece (e.g., a single piece of plastic, which may be formed through plastic injection molding or 3D printing) to which the legs 210 are connected using suitable connecting mechanisms (e.g., screws, bolts, etc.). In some embodiments, the central portion 200, posts 108/408, and legs 210 are separate components connected using suitable connecting mechanisms (e.g., screws, bolts, etc.).

One example of dimensions for the hanger 106/406 is approximately 163 mm by 163 mm with a height of approximately 82 mm and the posts 108/408 having new-school spacing. Other dimensions are possible.

In some embodiments, a hanger system includes a plurality of (e.g., two) hangers 106/406. Each hanger 106/406 may be used to hang a separate skateboard, or two hangers 106/406 may be used to hang a single skateboard.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A skateboard-deck wall hanger, comprising:
a base comprising:
a central portion, and
a plurality of legs connected to and extending away from the central portion, wherein each leg of the plurality of legs is oriented to extend toward a wall when the base is mounted on the wall; and
four posts to be inserted into four respective holes on a skateboard deck, the four posts extending outward from the base and having a spacing corresponding to a spacing of the four holes, wherein the four posts are oriented to extend away from the wall when the base is mounted on the wall.

2. The skateboard-deck wall hanger of claim 1, wherein the central portion and the plurality of legs are integrally connected as a single piece.

3. The skateboard-deck wall hanger of claim 1, wherein the central portion and the four posts are integrally connected as a single piece.

4. The skateboard-deck wall hanger of claim 1, wherein the central portion, the plurality of legs, and the four posts are integrally connected as a single piece.

5. The skateboard-deck wall hanger of claim 1, wherein the four posts extend outward from an outer surface of the central portion of the base, wherein the outer surface is oriented to face away from the wall when the base is mounted on the wall.

6. The skateboard-deck wall hanger of claim 1, wherein the four posts are insertable through the four holes on the skateboard deck.

7. The skateboard-deck wall hanger of claim 6, wherein each post of the four posts forks into a plurality of extensions at a distal end, the plurality of extensions forming a spring and being jointly insertable through a respective hole of the four holes on the skateboard deck.

8. The skateboard-deck wall hanger of claim 7, wherein each post of the four posts forks into two extensions at the distal end.

9. The skateboard-deck wall hanger of claim 7, wherein:
the plurality of extensions comprises a first extension and a second extension; and
the first extension of each post of the four posts comprises a hook at a distal end, the hook being insertable through a respective hole of the four holes on the skateboard deck.

10. The skateboard-deck wall hanger of claim 6, wherein each post of the four posts comprises a hook at a distal end, the hook being insertable through a respective hole of the four holes on the skateboard deck.

11. The skateboard-deck wall hanger of claim 1, wherein the central portion has a domed shape.

12. The skateboard-deck wall hanger of claim 1, wherein the central portion has an aperture.

13. The skateboard-deck wall hanger of claim 12, wherein:
the central portion comprises four leaves extending into the aperture; and
the aperture comprises a central opening and four recesses extending from the central opening, wherein each recess of the four recesses is situated between two respective leaves of the four leaves.

14. The skateboard-deck wall hanger of claim 13, wherein the four recesses extend radially from the central opening.

15. The skateboard-deck wall hanger of claim 13, wherein:
the center of the aperture is substantially coincident with the center of the central portion;
the four leaves are substantially evenly radially distributed about the center of the aperture; and
the four recesses are substantially evenly radially distributed about the center of the aperture.

16. The skateboard-deck wall hanger of claim 12, wherein the central portion along with the aperture has a domed shape.

17. The skateboard-deck wall hanger of claim 1, wherein a distal end of each leg of the plurality of legs has an opening to mount the base on the wall.

18. The skateboard-deck wall hanger of claim 1, wherein the plurality of legs comprises at least three legs.

19. The skateboard-deck wall hanger of claim 1, wherein the plurality of legs comprises four legs.

20. A skateboard-deck wall hanger, comprising:
a base comprising:
  a central portion having an aperture and comprising four leaves extending into the aperture, wherein:
    the aperture comprises a central opening and four recesses extending radially from the central opening,
    each recess of the four recesses is situated between two respective leaves of the four leaves, and
    the central portion along with the aperture has a domed shape; and
  four legs connected to and extending away from the central portion, wherein:
    each leg of the four legs is oriented to extend toward a wall when the base is mounted on the wall, and
    a distal end of each leg of the plurality of legs has an opening to mount the base on the wall; and
four posts to be inserted into four respective holes on a skateboard deck, the four posts extending outward from an outer surface of the central portion of the base and having a spacing corresponding to a spacing of the four holes, wherein:
  each post of the four posts forks into a plurality of extensions at a distal end,
  a first extension of the plurality of extensions of each post comprises a hook at a distal end, and
  the outer surface is oriented to face away from the wall when the base is mounted on the wall;
wherein the central portion, the plurality of legs, and the four posts are integrally connected as a single piece.

* * * * *